(12) United States Patent
Masaki et al.

(10) Patent No.: US 6,996,630 B1
(45) Date of Patent: Feb. 7, 2006

(54) INTEGRATED NETWORK SYSTEM

(75) Inventors: Ichiro Masaki, Boxborough, MA (US); Ichiro Mizunuma, Brighton, MA (US)

(73) Assignees: Mitsubishi Denki Kabushiki Kaisha, Tokyo (JP); Massachusetts Institute of Technology, Cambridge, MA (US)

( * ) Notice: Subject to any disclaimer, the term of this patent is extended or adjusted under 35 U.S.C. 154(b) by 844 days.

(21) Appl. No.: 09/763,142

(22) PCT Filed: Jun. 15, 2000

(86) PCT No.: PCT/US00/40207

§ 371 (c)(1),
(2), (4) Date: Jan. 29, 2002

(87) PCT Pub. No.: WO00/79719

PCT Pub. Date: Dec. 28, 2000

Related U.S. Application Data

(60) Provisional application No. 60/140,284, filed on Jun. 18, 1999.

(51) Int. Cl.
*G06F 15/173* (2006.01)

(52) U.S. Cl. ........................ 709/239; 709/240

(58) Field of Classification Search ........ 709/238–242, 709/249, 250, 203, 207, 225, 227, 228; 370/230, 370/235, 237, 238, 351, 395.21; 379/208.01
See application file for complete search history.

(56) References Cited

U.S. PATENT DOCUMENTS

| | | | | |
|---|---|---|---|---|
| 3,917,910 A | * | 11/1975 | Nielson ................. | 379/205.01 |
| 4,839,892 A | * | 6/1989 | Sasaki ....................... | 370/348 |
| 5,237,695 A | | 8/1993 | Skokan et al. | |
| 5,402,478 A | * | 3/1995 | Hluchyj et al. ........ | 379/221.01 |
| 5,633,866 A | | 5/1997 | Callon | |
| 5,686,167 A | | 11/1997 | Rudy | |
| 5,699,358 A | * | 12/1997 | Festl et al. ................. | 370/351 |
| 5,774,660 A | * | 6/1998 | Brendel et al. ............. | 709/201 |
| 5,832,197 A | * | 11/1998 | Houji ........................... | 714/4 |
| 5,864,542 A | | 1/1999 | Gupta et al. | |
| 5,991,302 A | * | 11/1999 | Berl et al. .................. | 370/400 |
| 6,115,751 A | * | 9/2000 | Tam et al. .................. | 709/240 |
| 6,199,124 B1 | * | 3/2001 | Ramakrishnan et al. ...... | 710/40 |
| 6,310,946 B1 | * | 10/2001 | Bauer et al. ........... | 379/208.01 |
| 6,335,927 B1 | * | 1/2002 | Elliott et al. ................ | 370/352 |
| 6,487,289 B1 | * | 11/2002 | Phan et al. ................. | 379/243 |
| 6,490,287 B1 | * | 12/2002 | Kilkki .................... | 370/395.42 |
| 6,493,317 B1 | * | 12/2002 | Ma ............................ | 370/237 |

(Continued)

OTHER PUBLICATIONS

Qingming Ma et al., "Routing Traffic with Quality-of-Service Guarantees in Integrated Services Networks", In 8th IEEE/ACM International Workshop on Network and Operating Systems Support for Digital Audio and Video (NOSSDAV'98), England, Jul. 1998.*

(Continued)

*Primary Examiner*—David Wiley
*Assistant Examiner*—Yemane Mesfin Gerezgiher
(74) *Attorney, Agent, or Firm*—Leydig, Voit & Mayer, Ltd.

(57) ABSTRACT

An integrated network gives priority to message traffic associated with a first network over message traffic associated with a second network. This arrangement allows a private network, such an emergency network, to be integrated with a public network, such as a cellular network, while preventing the cellular network traffic from blocking emergency network traffic. Lower priority connections can be preempted by higher priority connections. The integrated network can migrate a request from a first node to a neighboring node and can re-route a connection around a failed link.

12 Claims, 8 Drawing Sheets

U.S. PATENT DOCUMENTS

| | | | |
|---|---|---|---|
| 6,590,867 B1 * | 7/2003 | Ash et al. | 370/236 |
| 6,597,393 B2 * | 7/2003 | Kato et al. | 348/211.99 |
| 6,826,405 B2 * | 11/2004 | Doviak et al. | 455/445 |
| 2001/0056579 A1 * | 12/2001 | Kogane et al. | 725/105 |
| 2002/0146103 A1 * | 10/2002 | Holt et al. | 379/211.02 |

OTHER PUBLICATIONS

Rajagopalan et al., "A framework for QoS-based routing in the Internet", Network Working Group (RFC 2386), Aug. 1998.*

* cited by examiner

INTEGRATED NETWORK SYSTEM

CROSS REFERENCE TO RELATED APPLICATIONS

This application is a 371 patent application of PCT/US00/40207, filed on Jun. 15, 2000, which claims the benefit of U.S. Provisional Patent Application No. 60/140,248, filed on Jun. 18, 1999.

STATEMENT REGARDING FEDERALLY SPONSORED RESEARCH

Not Applicable.

FIELD OF THE INVENTION

The present invention relates generally to communication networks, and more particularly, to network protocols.

BACKGROUND OF THE INVENTION

Two known types of communication networks are private networks and public networks. Examples of private networks include communication networks owned or rented by road administration authorities, police, electricity companies, railway companies, and other institutions. These networks are dedicated to communications for the institutions that own or rent them such that third parties cannot access them even if they are idle. Exemplary public networks include public telephone, cellular phone, and the Internet.

While private networks generally provide reliable communications, they have certain concomitant disadvantages. One significant drawback to private networks, such as emergency networks, is cost since they are normally idle. Thus, the overall cost of the network is borne by relatively few users. In addition, many private networks are not as sustainable as desired. The communication networks for road authorities, police and electricity companies, for example, are desired to work under unusual conditions, such as severe storms and earthquakes. However, private networks typically have fewer nodes, and therefore, fewer potential pathways from source to destination. A connection failure between nodes within the private network may significantly impact or prevent communication between first and second locations. In contrast, a public network typically has a relatively large number of potential pathways such that a break between nodes can easily be avoided with relatively little service degradation.

Most private network users, however, cannot replace their private networks with public networks for several reasons. One significant reason is priority control. In one example, a road authority installs a surveillance camera for monitoring traffic conditions and connects the camera to a traffic control center through the road authority private network. If this private network is replaced with a public cellular phone network, there is no impact under normal conditions. However, if a serious traffic accident occurs and a traffic jam is created, many people near the scene will try to use their cellular phones. Since the network users are provided service on a "first come, first serve" basis, the high cellular phone traffic may prevent the surveillance camera from sending its data to the traffic center because the public cellular phone network is busy. In other words, the traffic surveillance system cannot work when it is most needed if it utilizes the public networks instead of the private network.

The IPv6 protocol is an example of a protocol with conventional priority control that classifies messages into eight priority classes depending on the category of each message. Exemplary message categories include background messages (including netnews), email, file transfer, interactive transfer (including telnet), and network control messages. Messages in the same category do not have different priorities. For example, if ten traffic monitoring cameras request to send their images to a traffic control center and if there is a transmission capacity for only one camera, priority control in the IPv6 protocol does not differentiate between the cameras because all of the ten requests are in the same category and the requests are serviced on a "first come, first serve" basis. If one camera keeps occupying the transmission line by continually sending real-time video information, the other nine cameras must wait until the transmission line becomes available in a the carrier sense multiple access/collision detection scheme, for example.

It would, therefore, be desirable to provide an integrated network including a first network, e.g., a private network, and a second network, e.g., a public network, that can utilize the capacity of the first network while giving priority to messages associated with the first network over messages associated with the second network. It would further be desirable to migrate data requests from a first node to a second node based upon the capacity, for example, of the first node.

SUMMARY OF THE INVENTION

The present invention provides an integrated network formed from a plurality of network that assigns a higher priority to data traffic associated with a first network than data traffic associated with a second network. This arrangement allows a private network, such as a traffic surveillance network, to be integrated to a public network, such as a cellular phone network, so as to increase the overall capacity of the network while preventing the lower priority cellular traffic from blocking higher priority private network traffic. While the invention is primarily shown and described in conjunction with a traffic surveillance network for providing vehicle traffic and accident images to a traffic control center, it is understood that an integrated network in accordance with the present invention is applicable to any network configuration in which messages associated with one network should be given priority over messages associated with another network.

In one aspect of the invention, an integrated network includes a first network having a plurality of nodes generating message traffic with a higher priority than message traffic associated with a second network. A request by a first node of the first network can preempt existing connections associated with the second network on as needed basis. In general, an existing connection is preempted when a requested connection cannot be established and the existing connection has a lower priority than the requested connection. If there is not a lower priority connection that exists, the requested connection is moved to another output link if possible.

In a further aspect of the invention, the priority of a request is determined from a plurality of priority factors, such as a value assigned to a node, a value that corresponds to elapsed time, a value corresponding to conditions proximate the requested server, a value corresponding to the requested bandwidth, and a value corresponding to nodes that neighbor a requested server. In one embodiment, selected ones of the priority factors are added to provide a priority for the request.

In another aspect of the invention, a request to a first node can be migrated to a second node. Upon receiving the request, the first node determines its load and capacity to service the request. The first node can respond by refusing the request, decreasing the requested bandwidth and accepting the request, terminating an existing lower priority connection and accepting the request, or attempting to migrate the request to a neighboring node. In a traffic surveillance application, the first node can include a neighboring node table that includes values for each of the neighboring nodes indicative of the similarity of the camera fields of view. The first node selects a neighboring node and sends to it a request migrate message. The neighboring node returns either a reject migrate message or an acknowledge migrate message. Where the neighboring node accepts the request, notify migration messages can be sent to clients with existing connections in advance of closing certain existing connections as necessary to service the migrated request.

BRIEF DESCRIPTION OF THE DRAWINGS

The invention will be more fully understood from the following detailed description taken in conjunction with the accompanying drawings, in which.

DETAILED DESCRIPTION OF THE INVENTION

The present invention provides an integrated network that can include a plurality of networks, such as private networks and public networks. As used herein private network generally refers to a network, such as a police or traffic surveillance network, having messages that deserve greater priority than messages in a typical public network, such as a cellular phone network. It is understood that a conventional private network, e.g., independent network, that is integrated with other networks, e.g., public networks, may still be referred to as a "private" network for purposes of describing an integrated network in accordance with the present invention.

In the integrated network, the outer nodes of the plurality of networks are connected to each other to form a single integrated network. By coupling a private network to a public network, for example, discontinuities in the private network can be avoided by utilizing the public network while giving priority to messages associated with the private network. For emergency networks, e.g., private networks, which generally require reliable communication under extreme conditions, accessing the public network enhances the sustainability of private network communications by providing routing pathways external to the private network.

Figure 1:
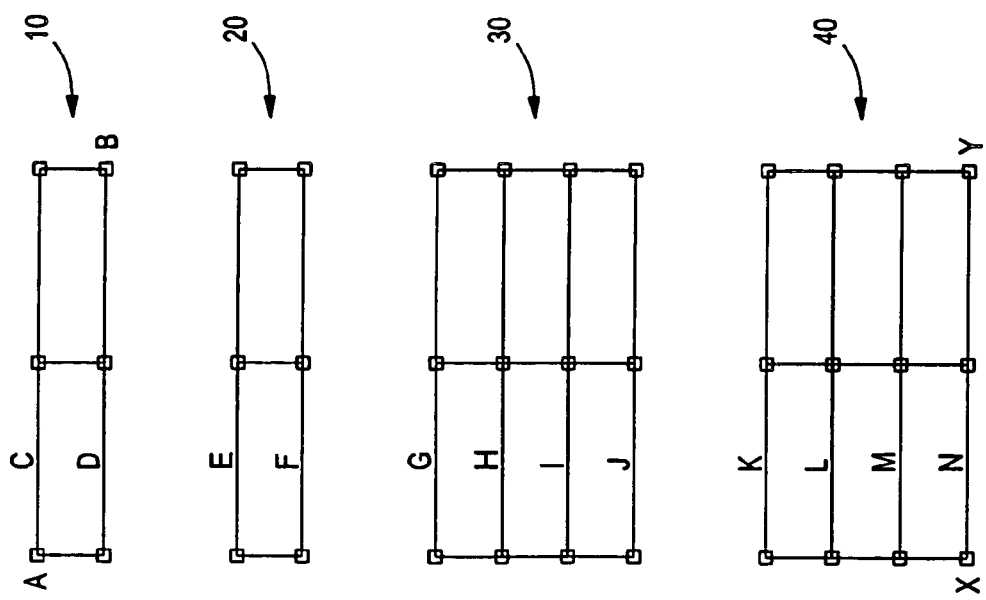
FIG. 1 is a schematic diagram of a prior art configuration of public and private networks.

FIG. 1 shows first and second private networks 10,20 and first and second public networks 30,40 in a conventional architecture. The four networks 10,20,30,40 are independent of each other such that, for example, communication between points A and B in the first private network 10 becomes unavailable if network paths C and D are broken.

Figure 2:
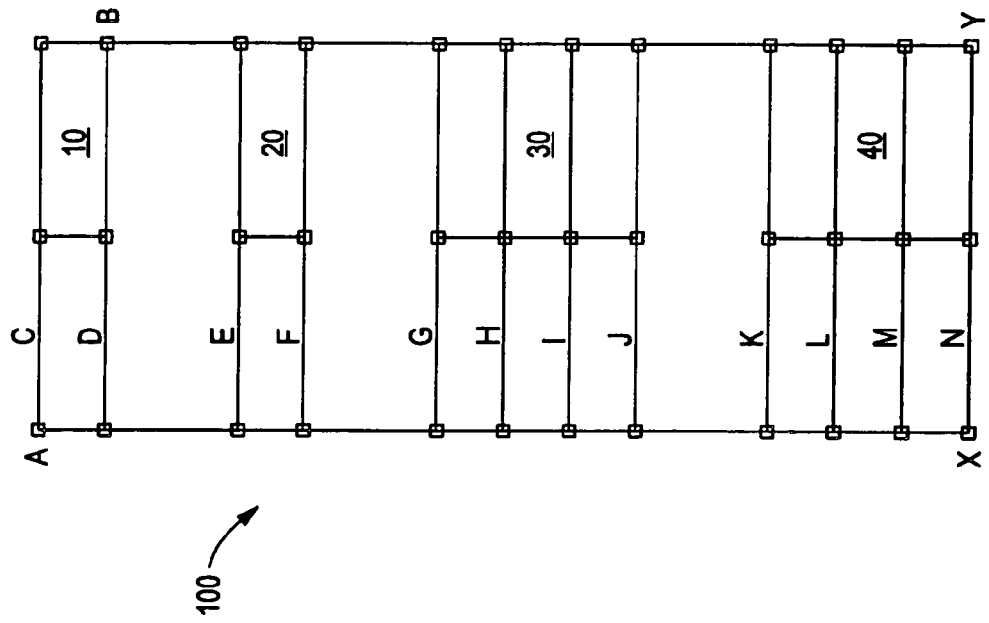
FIG. 2 is a schematic diagram of an integrated network system in accordance with the present invention.

FIG. 2 shows an integrated network 100 in accordance with the present invention in which the networks 10,20,30, 40 of FIG. 1 are connected to each other so as to integrate the private and public networks. Points A and B can communicate unless each of network paths C–N are broken. Prioritizing connections between certain nodes, as described in detail below, enhances the sustainability of the networks in the event of network node failures. In general, a router can schedule packets according to the priorities of the packets themselves or the priorities of the connections to which the packets belong. The priorities can be either constant or changed dynamically.

For example, points X and Y on the second public network 40, e.g., a public cellular network, can communicate through points A and B if the cellular network 40 is busy and the first private network 10, e.g., a vehicle traffic surveillance network, is idle. Point A can be a surveillance camera, point B can be a traffic center, and points X,Y can be drivers having cellular phones coupled to the cellular network 40. In the case where an accident occurs proximate surveillance camera A, cellular customers X and Y may not be able to communicate because the communication demands of the public cellular phone cell proximate the accident can saturate the cellular network. In accordance with the present invention, X and Y may not be allowed to communicate through A and B because a direct connection between A and B should be used to send the scene image taken by the surveillance camera A to the traffic center B. Priority control within the networks in accordance with the present invention can prohibit X and Y from communicating through A and B, because a connection between the surveillance camera A and the traffic center B has a higher priority.

Furthermore, in the case where the first network 10 is broken at links C and D. The priority control scheme in accordance with the present invention allows A and B to communicate through X and Y even if the lines between X and Y are being used by cellular network customers. The lines between X and Y can be assigned to A and B by terminating at least some of the existing connections between cellular customers X and Y. A and B can communicate if any one of links C–N is operational. Thus, the integrated network 100 can provide dedicated connections to priority users, as in private networks, by using another network, e.g., a public network, on an as needed basis.

Figure 3:
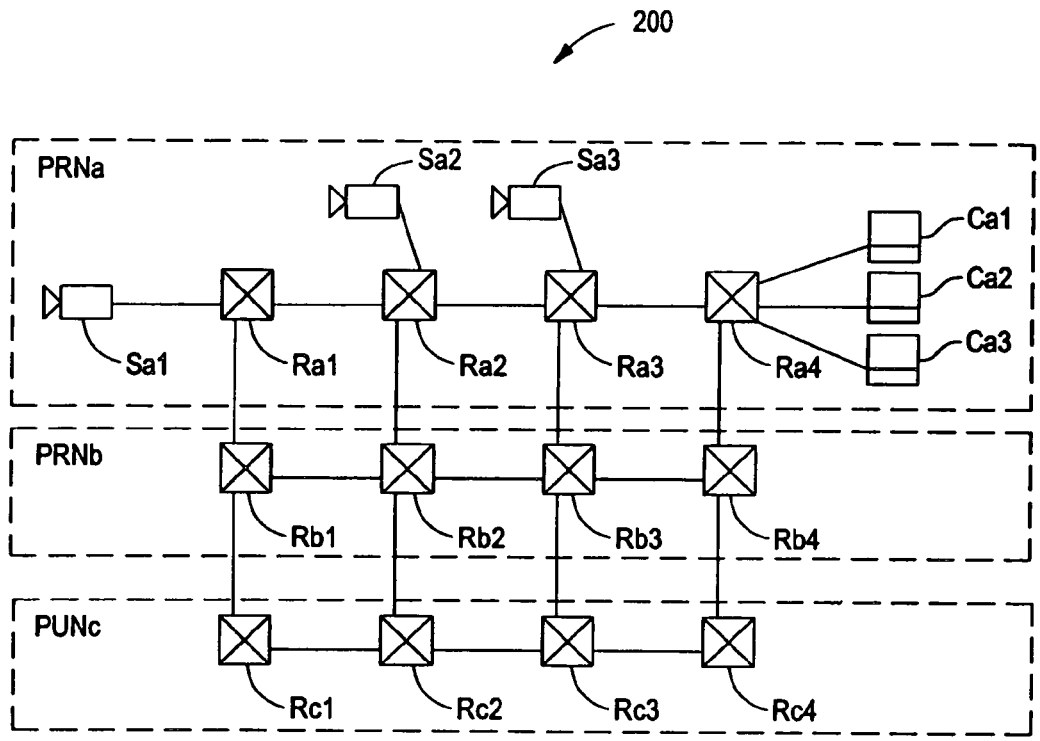
FIG. 3 is a block diagram of a further integrated network in accordance with the present invention.

FIG. 3 shows an exemplary embodiment of an integrated network 200 in accordance with the present invention. The integrated network includes a first network PRNa having first, second, third and fourth routers Ra1–4 that form a serial pathway from a first sensor Sa1 to a series of clients Ca1–3. A second sensor Sa2 is coupled to the second router Ra2 and a third sensor Sa3 is coupled to the third router. The integrated network 200 further includes a second network PRNb having a plurality of serially connected routers Rb1–4 and a third network PUNc also having a plurality of serially connected routers Rc1–4. Although not shown, it is understood that the routers can have any number of devices connected thereto, and can include subnets.

In one embodiment, the routers form an array having three rows and four columns. The first network routers Ra1–4 comprise the first row of the array, the second network routers Rb1–4 comprise the second row, and the third network routers Rc1–4 comprise the third row. The first router Ra1,Rb1,Rc1 in each of the first, second and third networks, comprise the first column of the array, the second routers Ra2,Rb2,Rc3 comprise the second column, the third routers Ra3,Rb3,Rc3 comprise the third row and the fourth routers Ra4,Rb4,Rc4 comprise the fourth column. It is understood, of course, that this configuration can be readily varied by one of ordinary skill in the art.

The sensors Sa1–3 can be selected from a variety of devices that transmit and/or receive data, which can be in the form of text, video, audio, and multimedia data, for example. Similarly, the term client is understood to include any device that can request data from one or more of the sensors Sa1–3.

Figure 4:
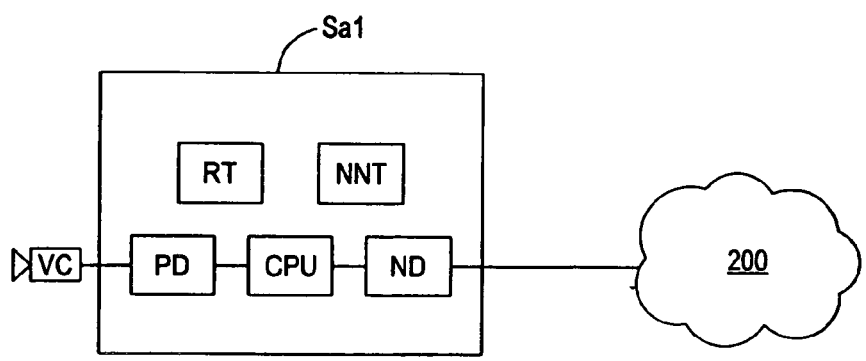
FIG. 4 is a schematic diagram of a camera sensor that can form a part of the integrated network of FIG. 3.

FIG. 4 shows an exemplary sensor Sa1 that can be coupled to the network 200. The camera sensor Sa1 includes a video camera VC for providing digital image data of a predetermined field of view (FOV) to a client, which can include any type of computer that can request information from the camera sensors Sa1–3. In one embodiment, the sensor can be used as a surveillance camera to provide traffic condition information to a traffic control center. Operation of the camera VC is controlled by position device PD that determines the camera's FOV under the control of a CPU. A network device ND provides an interface between the sensor Sa1 and the network 200. The sensor further includes a request table RT and a neighbor node table NNT, which are described below. In general, the request table RT includes client request info, such as client identification and bandwidth information, and the neighbor node table NNT includes information relating to possible overlap in neighboring camera FOV's to facilitate connection migration from one camera to another.

Referring again to FIG. 3, in general, the clients Ca1–3 request data from the sensors Sa1–3 to allow the traffic center monitor traffic conditions. The sensors Sa1–3 can request a connections to clients Ca1–3 as well. Under normal conditions, e.g., typical traffic flow and all network paths operating at full capacity, data transfer between the sensors Sa1–3 and the clients Ca1–3 is generally routed within the first network PRNa. In addition, the first network routers Ra1–3 can route data from the second and third networks PRNb,PUNc to destinations external (and internal) to the first network PRNa. As described in detail below, connections to the first network clients Ca1–3 have priority over connections from outside the first network.

In describing a protocol that allows clients to set up a connection have a higher priority than other connections in accordance with the present invention, reference is made to various network devices such as routers. Certain features of the routers for implementing such a protocol are described below.

Figure 5:
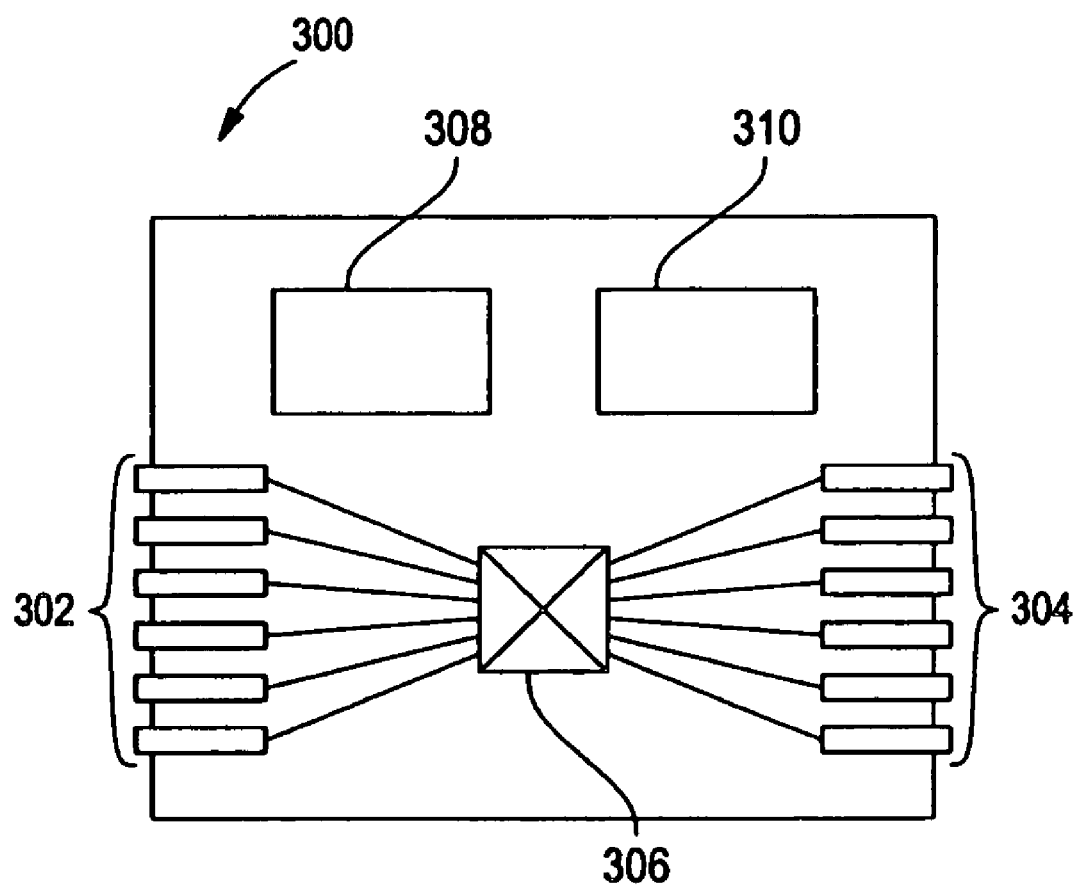
FIG. 5 is a schematic block diagram of a router that can form a part of the integrated network of FIG. 3.

FIG. 5 shows an exemplary configuration for a router 300 in an integrated network in accordance with the present invention having a series of input links 302 and a series of output links 304. A connection between an input link and an output link is provided by the router switching fabric 306.

The switching fabric 306 is controlled by a routing table 308 and a router connection management table (CMT) 310, which combine to manage connections between the input and output links 302,304. Connections whose route includes the router are registered in the CMT 310 and managed by the connection manager. The connection manager will be activated by a request, such as a request to establish a new connection, a request to close a connection, and a notification of a link failure. Table 1 below shows an exemplary embodiment of a router connection management table (CMT).

TABLE 1

| RECORD | FIELDS |
|---|---|
| connection ID | routing layer |
| | content, protocols |
| | I/O link |
| | IP source address |
| | IP destination address |
| | BW requirement |
| | BW sharing |
| | priority parameters |
| | user ID |

The connection ID is unique to the router and locally identifies the connection. The routing layer field indicates the layer, e.g., 3, 4, or 7, in which the connection is routed, as described further below. In the case where layer 7 will route the connection, the content/protocol field identifies the type of information, e.g., video, data, etc., and the corresponding input and output protocols that are used for the connection. The I/O link identifies the input link and the output link of the router for the connection. The bandwidth (BW) requirement field indicates the bandwidth parameters, e.g., maximum, minimum, and average, for the connection. The bandwidth sharing field contains information for determining if and how a connection shares bandwidth with another connection, as described more fully below. The priority parameters field provide priority information for the connection, which is also described below.

Each router also includes a routing table. An exemplary routing table is set forth below in Table 2.

TABLE 2

| RECORD | DESTINATION IP ADDRESS | OUTPUT LINK LIST |
|---|---|---|
| 1 | 1.2.3.4 | 1,10 |
| 2 | 5.6.7.(0–255) | 2,10 |
| 3 | 100.101.(0–255).(0–255) | 3,10 |

As known to one of ordinary skill in the art, for each record there is a corresponding destination IP address and a relationship between an input link and an output link.

Figure 6:
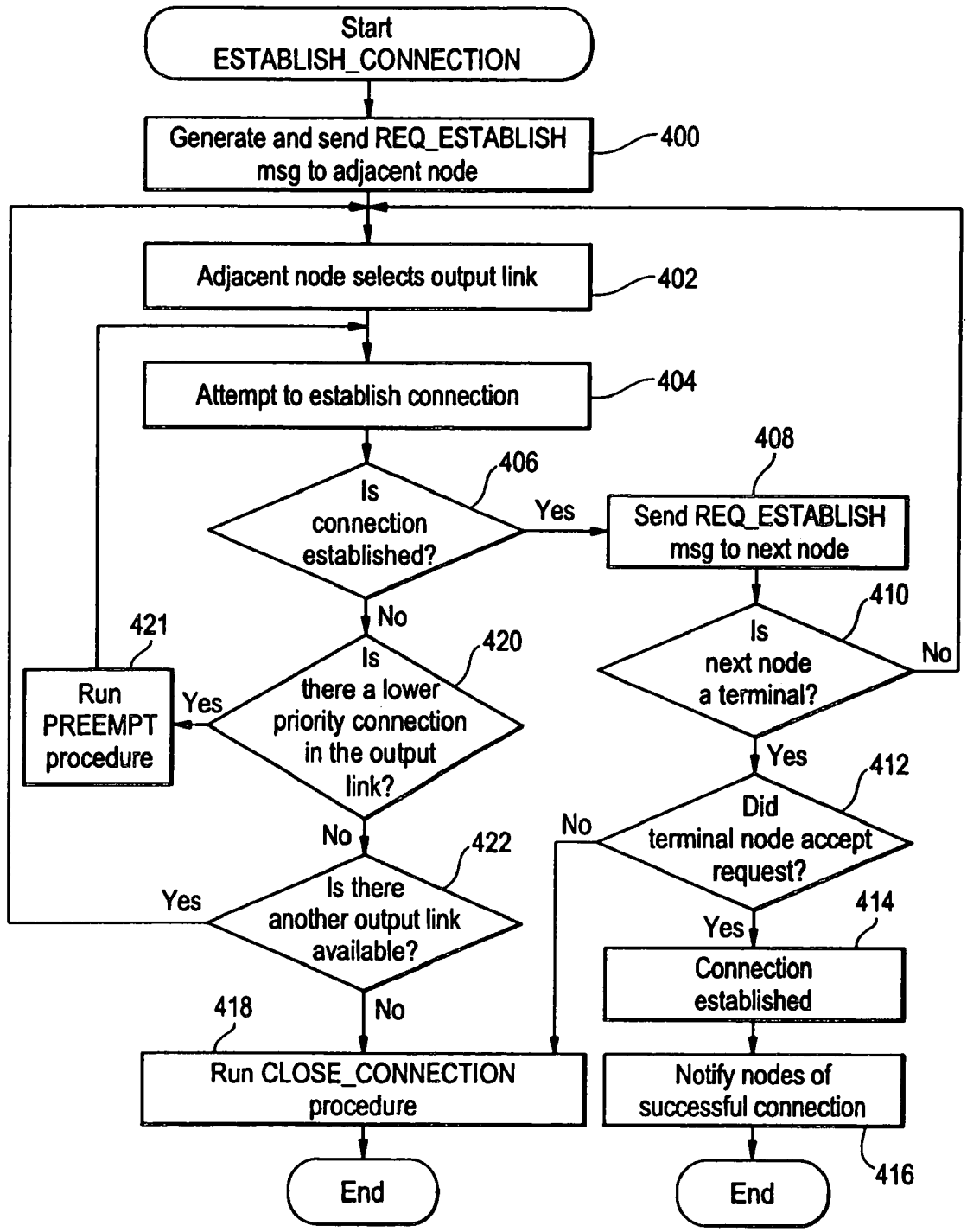
FIG. 6 is flowchart showing an exemplary sequence of steps for establishing a connection in accordance with the present invention.

FIG. 6, in combination with FIGS. 3–5, show an exemplary series of steps for implementing a protocol for an integrated network that provides priority to certain connections in accordance with the present invention. While reference is made to the traffic surveillance network of FIG. 3, it is understood that the invention is equally applicable to other applications. In addition, the steps indicate a sequence of events from a network viewpoint and not a particular node. Furthermore, it should be noted that the invention is described in the context of a connection based arrangement but is not limited thereto. That is, the invention is also applicable to so-called connectionless embodiments.

To establish a connection with a desired sensor such as Sa1, a node, e.g., client Ca1 sends a REQ_ESTABLISH message to an adjacent node in step 400. In step 402, the adjacent node, e.g., Ra4, selects an output link based upon the information in the routing table 308 (FIG. 5). In general, the connection manager examines whether the router can guarantee bandwidth requirements of the connections that already exist in addition to the requested connection. The connection manager locates a record for the destination IP address of the connection and chooses one of the active output links from the output link list. A link is considered active when the nodes can communicate with each other through the link. In one embodiment, the routing table 308 is static with connection between nodes being established in a predetermined order. That is, the routing tables are set up to route connections in a predetermined, prioritized order. It will be readily apparent to one of ordinary skill that routing can also be dynamic such that routing paths can be modified or re-prioritized. In step 404, the adjacent node, e.g., Ra4, attempts to establish a connection to the client Ca1. If the connection is established successfully, as determined in step 406, node Ra4 updates its CMT and sends a REQ_ESTABLISH message to an adjacent node, e.g., Ra3 in step 408. In step 410, it is determined whether the next node is a terminal node, e.g., Sa1. If the next node is not a terminal node, the node sends a REQ_ESTABLISH message to the next adjacent node in step 402, until the terminal node is reached. When the terminal node, e.g., Sa1, receives a REQ_ESTABLISH message, it is determined in step 412 whether the terminal node has accepted the request. If the request is accepted, the connection is established in step 414 and in step 416 nodes are informed of the successful connection. If the request is not accepted, the sensor Sa1 can initiate the CONNECTION_CLOSE procedure in step 418, for example. That is, the sensor sends a REQ_CLOSE message to the preceding node in. As described below, each node that receives the REQ_CLOSE message sends it to the preceding node in the connection until the terminal node, e.g., Ca1, receives the REQ_CLOSE message.

In step 420, if the connection was not successfully established with an adjacent node, the adjacent node determines if it contains a lower priority connection in the same output link. If there is a lower priority connection, such as from a remote client in the second network, a PREEMPT procedure is run in step 421, which is described further below. If there is not a lower priority connection, in step 422 the adjacent node determines whether another output link is available. If another output link is available, the adjacent node attempts to selects another output link in step 402. If another output link is not available, the adjacent node sends a REQ_CLOSE message to the preceding node in step 418.

Figure 7:
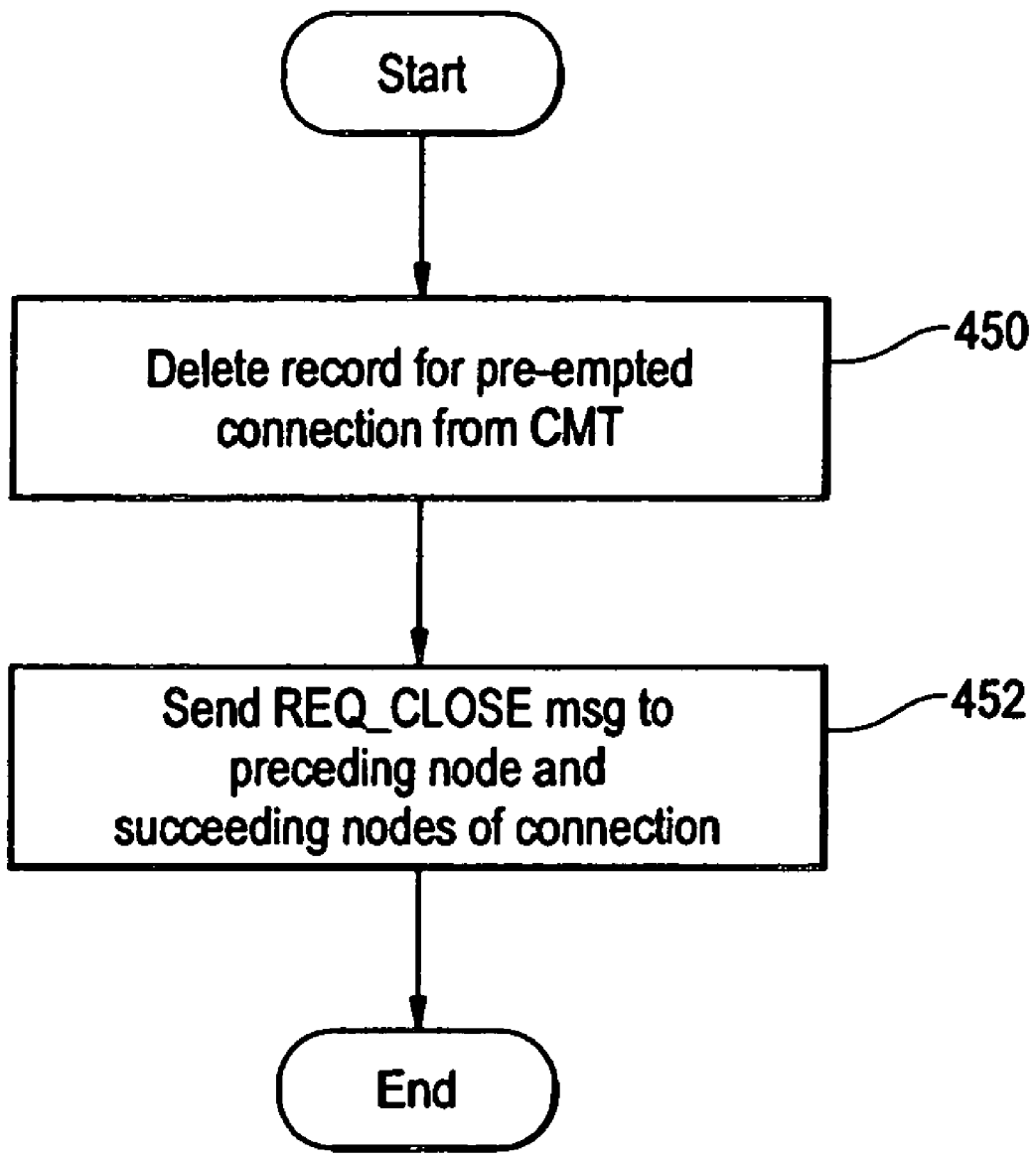
FIG. 7 is a flowchart showing an exemplary sequence of steps for preempting an existing connection in accordance with the present invention.

FIG. 7 shows an exemplary sequence of steps for the PREEMPT procedure. Once a lower priority connection at the output link of the adjacent node is identified for pre-emption, the record in the connection management table (CMT) corresponding to the lower priority connection is deleted in step 450. In step 452, a REQ_CLOSE message is sent by the adjacent node to the preceding node and the succeeding nodes of the pre-empted connection. Each subsequent preceding and succeeding node sends a REQ_CLOSE message until the terminal nodes, e.g., Ca1,Sa1, receive the REQ_CLOSE message. The adjacent node then attempts to establish the connection in step 404 (FIG. 6).

Figure 8:
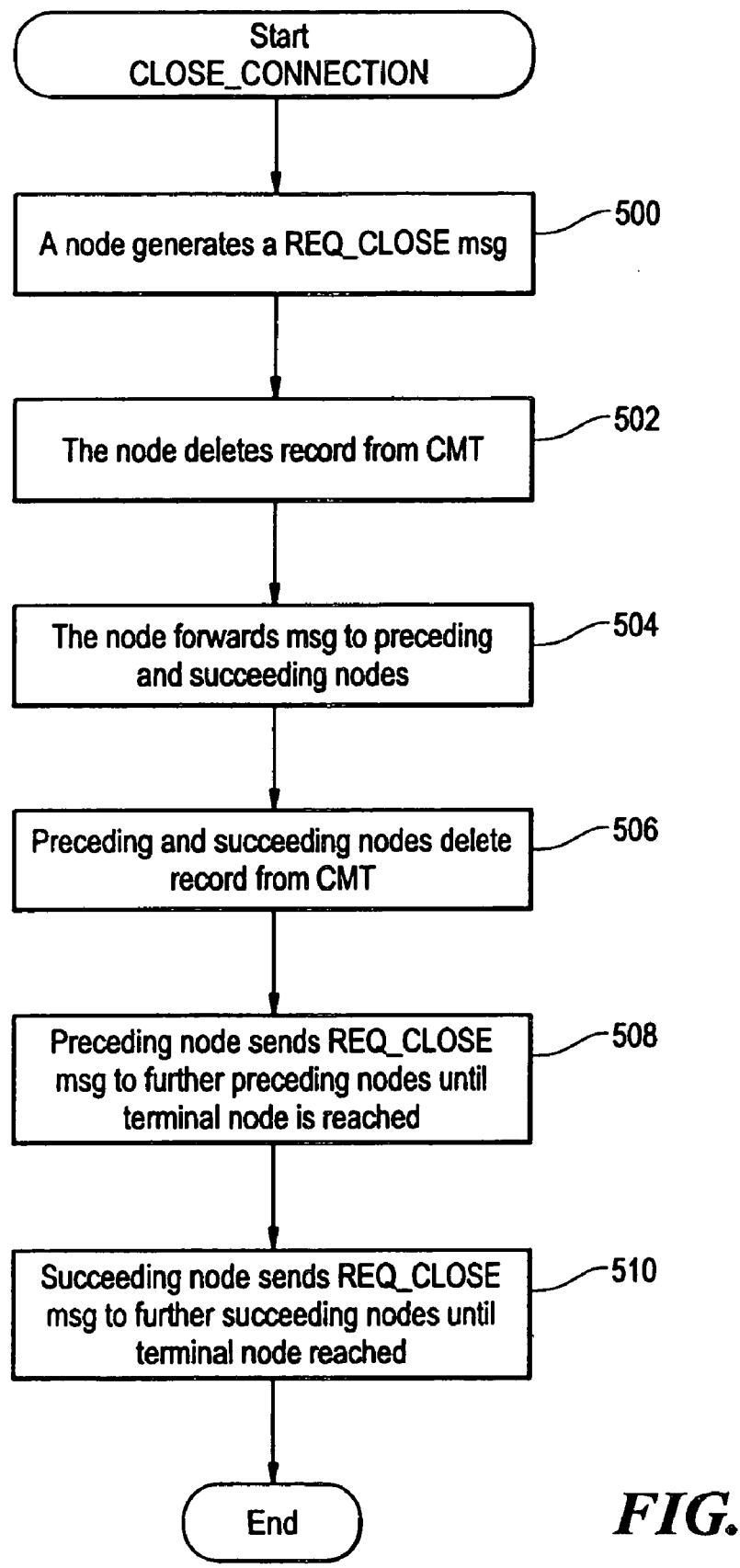
FIG. 8 is a flowchart showing an exemplary sequence of steps for closing a connection in accordance with the present invention.

An illustrative sequence of steps showing details of the CLOSE CONNECTION procedure is shown in FIG. 8. In step 500, a given node, such as the client Ca1, generates a REQ_CLOSE message and sends it to succeeding and preceding nodes, e.g., router Ra4. In step 502, the nodes delete the record corresponding to the connection from its CMT based upon information in the REQ_CLOSE message, which identifies the connection to be closed. The node, e.g., Ra4, sends a REQ_CLOSE message to preceding and succeeding nodes, e.g, Ra3, in step 504. The succeeding and preceding node delete the corresponding record from their respective CMTs in step 506, and forward the REQ_CLOSE message to further preceding and succeeding nodes in step 508 until the terminal nodes are reached in step 510. It is understood that for a terminal node, there is only a preceding node as in the present example.

Figure 9:
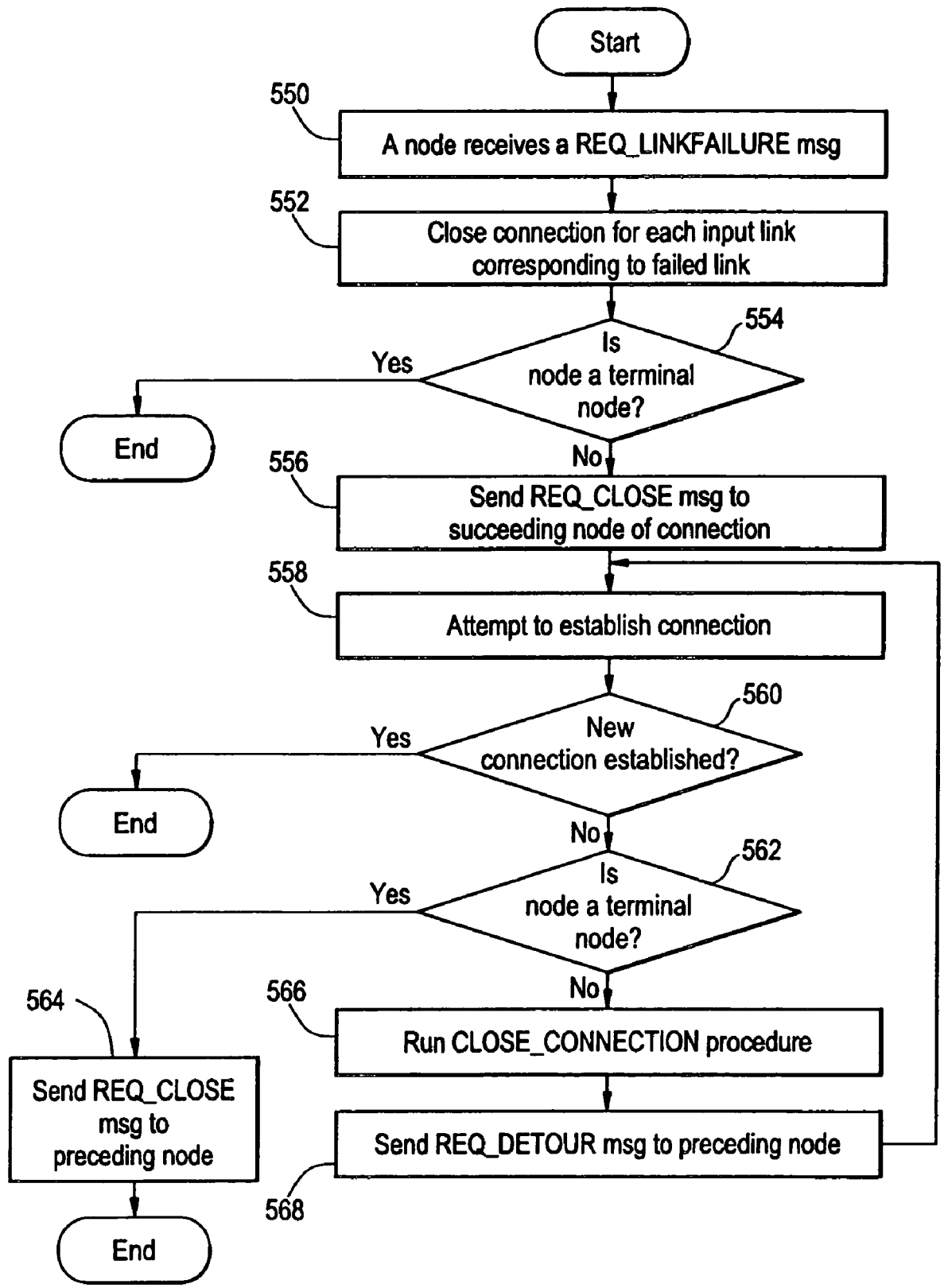
FIG. 9 is a flowchart showing an exemplary sequence of steps for handling a failed link in accordance with the present invention.

FIG. 9 shows an exemplary sequence of steps for handling a link failure in the network to allow a detour connection around the failed link. In step 550, a node receives a REQ_LINKFAILURE message generated by a device or software that detects the link failure in the same node. The node closes the connection for each input link corresponding to the failed link in step 552. In step 554, it is determined whether the node is a terminal node. If the node is a terminal node, the procedure terminates. If the terminal is not a terminal node, the node sends a REQ-CLOSE message to the succeeding node in the connection in step 556, and in step 558, the node attempts to establish a new connection such as by running the ESTABLISH CONNECTION procedure (FIG. 6). In step 560, if the connection is successfully established the procedure terminates. If the connection is not established, in step 562, it is determined if the node is a terminal node. If the node is a terminal node, in step 564, the terminal node sends a REQ_CLOSE message to the preceding node. In step 566, if the node is not a terminal node, the connection is closed, i.e., the record is deleted from the CMT, and in step 568, the node sends a REQ_DETOUR message to the preceding node and attempts to establish a new connection in step 558 based upon the information in the REQ_DETOUR message, which is described below.

Figure 10:
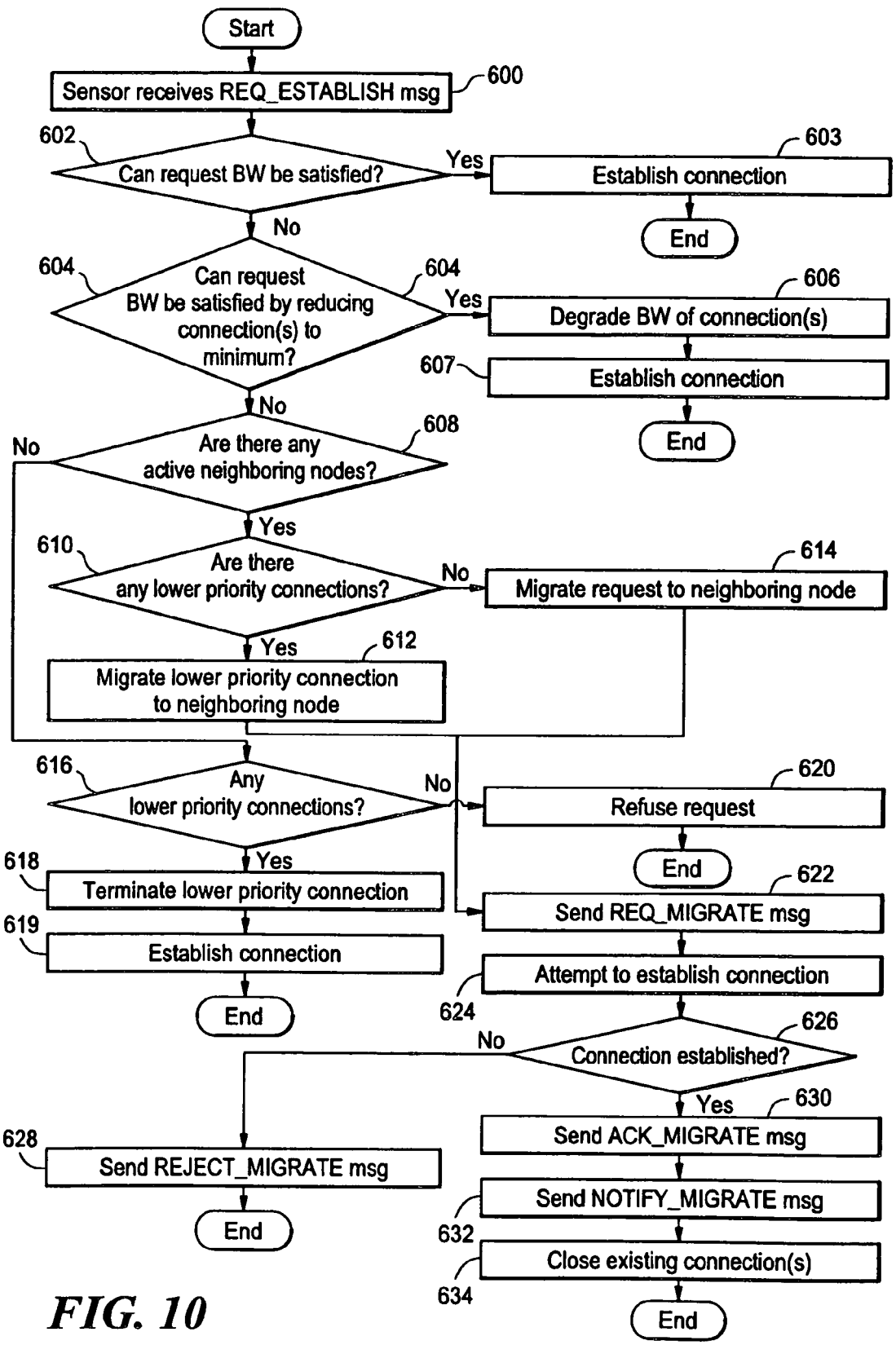
FIG. 10 is a flowchart showing an exemplary sequence of steps for migrating a request from one node to another in accordance with the present invention.

FIG. 10 shows an exemplary implementation for migrating a connection to a neighboring node in accordance with the present invention. In general, a given server, e.g., a sensor, receives a new request from a client, determines its availability, and determines whether to accept, modify, or attempt to migrate the request to another sensor having a similar FOV.

In step 600, a sensor, e.g., Sa2 receives a REQ_ESTABLISH message from a client, e.g., Ca2. The sensor Sa2 responds to the client request in a number of possible ways including refusing the request, degrading request and/or connection bandwidth, terminating an existing connection to service the new request, and selecting a neighboring node for migrating the request or existing connection.

In step 602, the sensor determines whether the BW requirements of the request can be satisfied in view of the current load of the sensor. If the sensor can handle the request, the requested connection is established in step 603. The connection can be established with the ESTABLISH_CONNECTION procedure, for example. If the request BW can not be satisfied, the sensor determines whether the request BW can be satisfied by degrading the BW of the request and/or connection to a minimum bandwidth in step 604. The minimum bandwidth is a parameter that can form part of the REQ_ESTABLISH message, as shown and described in conjunction with Table 4, for example. If BW degradation allows the sensor to service the request, the sensor decreases the bandwidth of the request and/or one or more existing connections as needed, in step 606. The priority of the request and connections can be used to reduce the bandwidths. After degrading the bandwidth(s), the requested connection can be established in step 607. If the request can be serviced by degrading the bandwidth(s), the sensor determines in step 608 whether there any active neighboring nodes.

If there are no neighboring nodes available, the sensor determines in step 616 if there any connections at the output link that have a lower priority than the request. If there are no lower priority connections, the request is refused in step 620. If there is a lower priority connection, it is terminated in step 618 and the requested connection can be established in step 619.

If there are neighboring nodes available, the sensor determines in step 610 whether there are any lower priority connections than the requested connection. If there is not a lower priority connection, the sensor attempts to migrate the request to a neighboring node in step 614. If there is a lower priority connection, the sensor attempts to migrate the lower priority connection to the neighboring node in step 612.

An exemplary neighboring node table is set forth below in Table 3. In general, each sensor includes a neighboring node table (NNT) that includes information regarding the similarity of the FOV of the other sensors. When migrating a connection from one sensor to another, the neighboring node table is used to identify the sensor having the most similar FOV to the node from which the connection is being migrated.

TABLE 3

| INDEX | IP ADDRESS | SIMILARITY OF TARGET |
|---|---|---|
| 1 | 1.2.3.4 | 75 |
| 2 | 1.2.3.5 | 40 |

For the three camera sensor network of FIG. 3, each sensor, e.g., Sa1, includes a neighboring node table having fields containing the IP address of the other sensors Sa2,Sa3 and a relative value indicative of the similarity between FOV of the first sensor and the sensors.

If the sensor attempts to migrate the request or an existing connection, in step 622, the sensor sends a REQ_MIGRATE message to the selected neighboring node and attempts to establish a connection in step 624. In step 626, it is determined whether the connection with the neighboring node was established. If the connection is not established, a REJECT_MIGRATE message is sent in step 628, and if a connection is established an ACK_MIGRATE message is sent in step 630. The neighboring node then sends a NOTIFY_MIGRATE message to clients having an existing connection with the node in step 632. In step 634, existing connections are terminated as needed to service the requested connection.

Exemplary formats for the messages described above are set forth in Tables 4–8. The header field identifies the message type, e.g., REQ_ESTABLISH message.

TABLE 4

REQ_ESTABLISH header
IP address of source node
IP address of destination node
user ID
local ID for user
max BW requirement
min BW requirement
ave BW requirement TABLE 4-continued

REQ_ESTABLISH

BW share percentage
$7^{th}$ layer switching
traffic type
first priority parameter (time)
second priority factor (situation)
third priority parameter (constant)

The REQ_ESTABLISH message includes BW requirement fields that define the resources needed for the connection. Based on the bandwidth requirements in the message, the node can accept, refuse, modify, or migrate (for a sensor for example) the connection request, as described above. In one embodiment, the REQ_ESTABLISH message includes fields for a maximum bandwidth requirement, a minimum bandwidth requirement, an average bandwidth requirement, and a bandwidth share percentage. In general, the router transmits all packets to the output link as long as the sum of the current bandwidth (number of packets*size/time) does not exceed the connection bandwidth. The bandwidth parameters in the REQ_ESTABLISH message allow the route to make BW sharing decisions. If the output link BW is exceeded, the router may drop packets in a connection.

The share percentage, if less than one hundred percent for example, would enable the connection bandwidth to be shared with other connections having compatible sharing percentages. The REQ_ESTABLISH message can further include a seventh layer switching indicator to enable protocol conversion, as described below. The traffic type field identifies the type of traffic, e.g., video, for protocol conversion or dynamic priority determinations for example.

The REQ_ESTABLISH message can also include first, second, and third priority parameters that can determine the priority of the connection. This arrangement provides some control over connection prioritization to a client. In addition, multiple clients, such as the clients Ca1–3 connected to the first network, can make intelligent decisions regarding the priority of connections among the sensors Sa1–3. In one embodiment, the first priority parameter corresponds to a time factor. The first priority parameter can be set to a predetermined value that can be increased in the case where an elapsed time becomes greater than desired. For example, the first priority parameter is five but if the elapsed time is greater than ten seconds, the first priority parameter is increased to eight. Elapsed time refers to the time from the connection is established to the current time. The second priority parameter can correspond to a situation factor. The third priority parameter can be a constant value, which can vary for each terminal to prevent terminals from having the same priority under similar conditions.

In one embodiment, an application program in the sensor, for example, can increase the priority of a connection upon detecting certain conditions by sending a SITUATION_ON message to an adjacent node. The message is forwarded to each router in the connection so as to increase the priority of the connection. If an application program in the sensor detects an emergency condition, such a fire, the program can send a SITUATION_ON message. The program can send a SITUATION_OFF message to change the connection priority back to normal.

In an alternative priority arrangement, the first, second, and third priority parameters provide a programmable priority function F(p). The first, second and third priority parameters can correspond to F(t), F(c), and F(n), and the priority function F(p) can be defined as follows:

$$F(p)=F(t)+F(c)+F(n)$$

where F(t) is a priority factor assigned to each terminal, F(c) is a condition factor that represents the condition of each terminal, and F(n) is a priority condition factor that represents the conditions of the neighboring terminals. For example, a traffic monitoring camera and a normal cellular phone can have 10 and 0 points as their F(t) values, respectively. F(c) can be 20 for calling 911 and the F(c) can be 0–30 points for depending on the image processing data transfer requirements. The F(c) value can also vary depending on other factors. For example, the F(c) value can be 30 for sending a 128×128-pixel image once every second while the F(c) value can be 5 for sending 640×480-pixel image every 33 msec. For the F(n) value, if there are three cameras which cover the accident scene and if there is a transmission capacity available only for one camera, those three cameras can negotiate to each other to select one of three by controlling F(n) values of the three camera terminals. If a certain camera terminal has F(t)=10, F(c)=20, and F(n)=5, its F(p) is 35.

It is understood that a server, e.g., a camera sensor, and a client can each provide the priority parameters in a REQ_ESTABLISH message. In the case where a client, e.g., Ca1, attempts to establish a connection with a sensor, e.g., Sa1, the client would know the priority factors for the sensor. If a sensor attempts to establish a connection, it can determine the priority parameters. For example, if a sensor detects a problem based on acquired image date, e.g., a traffic accident for a vehicle traffic surveillance network, the sensor can attempt to establish a connection with a relatively high F(c), for example.

TABLE 5

| REQ_CLOSE |
| --- |
| header |
| IP address of source node |
| IP address of destination node |
| user ID |
| local ID for user |

In general, nodes send the REQ_CLOSE message to adjacent nodes in a connection until the terminal nodes are reached. Upon receiving a REQ_CLOSE message, a node, such as a router deletes the record corresponding to the connection from its connection management table (CMT).

TABLE 6

| REQ_LINKFAILURE |
| --- |
| header |
| input link/output link |
| link ID |

The switching fabric 306 in a router 300 (FIG. 5) can detect a link failure in a conventional manner. Upon detecting the link failure, the router sends a REQ_LINKFAILURE message to other nodes affected by the failure. A router receiving a REQ_LINKFAILURE message closes connections to the failed input link and attempts to establish a new connection to replace the failed output link. If a new connection can not be established a REQ_DETOUR message is sent to a preceding node to find an alternate connection path in accordance with a predetermined routing scheme.

TABLE 7

| REQ_DETOUR |
| --- |
| header |
| IP address of source node |
| IP address of destination node |
| user ID |
| local ID for user |

The REQ_DETOUR message is sent by a node with a failed output link to a preceding node to establish an alternate routing path, as described above. In one embodiment, all the available routes for a connection between two nodes are determined by the routing tables in the routers. These routers are prioritized by the output link lists in the routing tables. Thus, a failed link is avoided by connecting to another node in accordance with a predetermined order.

TABLE 8

| REQ_MIGRATE |
| --- |
| header |
| IP address of requesting node |
| IP address of requested node |
| load to be migrated |

TABLE 9

| ACK_MIGRATE |
| --- |
| header |
| IP address of requesting node |
| IP address of requested node |
| load to be accepted |

TABLE 10

| REJECT_MIGRATE |
| --- |
| header |
| IP address of requesting node |
| IP address of requested node |

TABLE 11

| NOTIFY_MIGRATE |
| --- |
| header |
| IP address of server node |
| IP address of client node |
| user ID |
| local ID for user |

The REQ_MIGRATE, ACK_MIGRATE, REJECT_MIGRATE, and NOTIFY_MIGRATE messages cooperate to migrate a client request from one node to another. In general, when a heavily loaded sensor receives a new request the sensor has four options: refuse the new request; degrade the bandwidth of the new request; terminate an existing connection to service the new request; or migrate the request to a neighboring node. When a neighboring node, which can have the most similar FOV for a camera system, is selected, the first sensor sends a REQ_MIGRATE message to the selected neighboring node, which then responds by sending a REJECT_MIGRATE message to the first sensor or an ACK_MIGRATE message. The accepting neighboring node then sends NOTIFY_MIGRATE messages to clients having lower priority connections that will be closed.

In another aspect of the invention, a router having connections with first and second networks converts traffic from one protocol to another depending upon the type of data being sent. In one embodiment, protocol conversion information is contained in certain fields of the REQ_ESTABLISH message described above. In general, a protocol for a connection (or packet) can be converted when passing from an input link to an output link of a router (switch) according to the type of the traffic, e.g., video, audio, data, etc. Protocol conversion can be based upon a variety of factors including bit-error-rate of links, delay requirements, and security requirements.

Protocol conversion in accordance with the present invention is applicable for routing between an intranet, which can provide high security and high reliability, and the Internet, where security and reliability parameters are generally lower than intranets. For example, for video traffic through an intranet to the Internet, one may want to use the TCP protocol to achieve high reliability in transmission of video within the intranet. However, in the Internet, one may want to use the UDP protocol, for example, to avoid unpredictable retransmission of TCP protocol from interrupting smooth transmission of video traffic. In accordance with the present invention, a router between an intranet and the Internet, for example, converts the protocol of the video traffic from TCP to UDP protocol when the traffic passes from the intranet to the Internet through the router.

In addition, for traffic passing from the intranet to the Internet, a protocol supporting encryption of the traffic can be used in the Internet that is unnecessary within the intranet. In this case, a router adds a security protocol, such as SSL or IP-SEQ, to the traffic which goes out to the Internet. In one embodiment, such a protocol conversion can be done between a wired network and a wireless network having a packet-loss ratio higher than the wired network, between different ISPs (internet service providers) that provide different quality of service, and between intranets and the Internet.

Referring briefly again to FIG. 3, the second network PRNb, which can be an intranet, and the third network PUNc, which can be the Internet, are connected by a router Rb1. The router Rb1 can include a protocol conversion table an exemplary embodiment of which is set forth in Table 12. The REQ_ESTABLISH message, which is described in conjunction with Table 4 above, can provide the type of traffic content for a connection that can form the basis for the conversion.

TABLE 12

| TYPE OF TRAFFIC CONTENT | PROTOCOL SUITE IN FIRST NETWORK | PROTOCOL SUITE IN SECOND NETWORK |
| --- | --- | --- |
| "video-low quality" | UDP | TCP |
| "audio" | UDP, RTP | TCP |
| "data-low security" | TCP | TCP |
| "video-high quality" | UDP, RTP | TCP |
| "data-high security" | TCP | TCP, SSL |

For each connection, a router will check whether protocol conversion is specified for the connection in the connection management table. If the connection includes protocol conversion, the router will read the type of traffic content from the table and the protocol suites specified for the first and second networks that are connected to each other through the router. If the router cannot find a record for the type of traffic content, the router will not do any protocol conversion. If found, the router converts the protocols of the traffic in the manner specified by the protocols.

In another aspect of the invention, the integrated network can assign a priority to each transmission request. In one embodiment, priority assignments include unconditional and conditional assignments. With an unconditional assignment, each terminal has an assigned priority. For example, traffic surveillance cameras have a higher priority than cellular phones. With conditional priority assignment, the priority of each terminal changes depending on conditions. For example, a traffic monitoring terminal can include a camera and an image processor that can detect a traffic incident by analyzing the images acquired by the camera. With the conditional assignment scheme, the priority of this terminal is increased when the incident is detected by the image processor. Preferably, all the traffic monitoring terminals do not have identical priority. The terminals should have different priorities so that one of them is selected for communication.

In a further aspect of the invention, terminals in the integrated network contribute to the priority control. For example, if all the terminals that were turned down by the routers keep sending transmission requests every second, the network must spend a large portion of its resources to continue masking out low-priority requests. Each terminal can include a function to hold a transmission request for a certain time period that is determined by the routers based on traffic conditions. The terminals can also select the data to be transmitted within the assigned data amount.

In the case where three cameras request communication and there is transmission capacity for only one camera there are several options. A first option is to choose one camera. Another option is to decrease the image resolution of the first camera to a half, for example, and decrease the image resolution of second and third cameras to a quarter. A further option is to decrease the number of image frames per second instead of the image resolution. Additional options for altering the bandwidth will be readily apparent to one of ordinary skill in the art. In general, the terminal can selected the best option within the available capacity.

In another aspect of the invention, an integrated network provides enhanced quality of service. One conventional protocol is known as the resource reservation protocol (RRP), which reserves a communication line so that video information can be transmitted continuously in real-time for TV conferences. However, the quality of service provided by RRP does not match many of intelligent transportation system applications. For example, at a given moment it may be important to transmit image data from a traffic monitoring first camera to the traffic control center. At the next moment, if a larger accident occurs in the area that is covered by a second monitoring camera, the right of communication should be moved from the first camera to the second camera even in the middle of the transmission from the first camera.

The present invention provides a conditional resource reservation protocol. In one example, a traffic accident occurs in the area monitored by the first camera, which is assigned 50 and 200 priority points for 1 Mbps and 200 Kbps transmissions, respectively. First, the right of communication is assigned to all the messages that have 50 or more priority points. If there is more than a 1 Mbps communication capacity left, for example, the first camera sends images to the traffic center at the rate of 1 Mbps. Suppose that a new message-request with 60 priority points is raised and that the network does not have enough capacity to accept this request. The data rate from the first camera is decreased from 1 Mbps to 200 Kbps and its priority points are increased from 50 to 200.

In another feature of the invention, the integrated network includes a distributed control capability to handle concentrated access with minimum cost. In general, access to traffic monitoring cameras will be uneven. More particularly, clients may not try to access a camera terminal if its terminal processor indicates that the traffic is flowing smoothly in the area monitored by that terminal. In contrast, there may be many requests to access the camera that covers a severe traffic accident. In one embodiment, the routers in the integrated network include a function to switch among unicast, multicast, and broadcast modes depending on the form and degree of the concentration. The routers can also create mirror terminals to eliminate over-access to a particular terminal.

For example, suppose that traffic monitoring camera #1 gets three requests for images from internet addresses A@B, C@B, and D@E. The communication is reconfigured for one multicast to A@B and C@B and one unicast to D@E. In this example, the number of multicast service clients at domain B is two. The communication service from camera #1 to the clients in domain B is switched to the broadcast service if the number of clients exceeds the programmed threshold value.

In addition, if the number of accesses to a certain terminal exceeds the capacity of that terminal, its neighboring terminals become its mirror servers. If the access rate is larger than the capacity of those neighboring terminals, the neighboring terminals of the original neighboring terminals also become mirror terminals. The number of the mirror servers increases until the access rate becomes within the acceptable range. The number of the mirror servers decreases when the access rates become lower than the lower threshold.

In a still further aspect of the invention, an integrated network includes a higher level protocol which defines what protocol is utilized at each link. For example, suppose that it is desired to send image data from camera #1 to a local control station by a wireless network and then from the local control station to the traffic control center by an optical fiber. The error rate for optical fibers is significantly lower compared to wireless communication. The high level protocol utilizes, for example, the TP++ protocol and the user datagram protocol for the links between the camera and the local control station and the local control station and the traffic center, respectively. The error control scheme can be chosen by both the error rate of each link and the nature of each message. In other words, the high level protocol includes a representation of the acceptable error rate for each message, and the error rate of each link is stored in associated routers.

In yet another aspect of the invention, an integrated network includes a network scheme that includes multiple subsets of networks. As is known to one of ordinary skill in the art, higher security requires higher cost. The required security levels of the messages transmitted through an integrated network in accordance with the present invention is diversified significantly. For example, electronic transactions need higher security than the broadcast of weather forecast. Conventional network security research developed a number of technologies that increase the security level. SSL and IPSEC are examples of encryption techniques.

Each network subset has a different security level, and the servers for the higher security network have tighter management by certified institutions. Messages are assigned to appropriate subsets of networks to satisfy their security requirements with minimum cost. At the same time, messages can be assigned to different security networks for a better load balance among network subsets.

In one embodiment, the integrated network includes a hierarchy of security levels. The integrated network includes several subsets of networks for several different security levels. For example, the police network can be divided into three security levels: highest, higher, and high security networks. The highest security network is isolated from others and is not integrated into the network. In contrast, the high security network is integrated into the network. The high security police messages are transferred only through police servers if possible. If not, those messages are transferred through other secured network such as bank networks. Those messages can be transferred through normal public network if the capacity of all the secured networks is not large enough. Those messages are protected only by encryption technologies while being transferred through normal public network. Secured networks are safer because the servers of secured network are controlled by certified institutions. The higher security network is normally isolated from the integrated network, but it is connected to the integrated network immediately in case of emergency. In other words, the higher security network is the same with the highest one under normal conditions and is the same with the high security network in emergency cases.

In a further aspect of the invention, an integrated network includes an option control for integrating connection and connectionless communication schemes. The connection scheme establishes a connection before starting the communication, and keeps the connection until the communication is completed.

As known to one of ordinary skill in the art, telephone calls, for example use a connection scheme. It is less efficient because the communication line is idle while neither person is speaking. Internet takes the connectionless scheme in which the messages are divided into packets and the packets are transferred independently. The packets for a single message may be transferred through different routes and the earlier packet may be delivered to the destination later. Connectionless schemes are more efficient but cannot be used for telephone applications directly because it can not guarantee that the voice information is delivered within a certain time period. A conventional solution for using the connectionless scheme for telephone applications is a reservation method. With the reservation method, a communication line is reserved to guarantee the delivery of voice information within a certain time period. This method is effective but hurts the efficiency of the network, because the reservation method has both the drawbacks and merits of the connection scheme.

An option right, in accordance with the present invention, can keep a certain communication line assigned to a pair of clients. The communication line is used by them if either client is speaking. The communication line becomes available to the other clients if neither is talking. The communication line is assigned back to the clients who have the option when either of them resumes talking. This option control method realizes the real time performance that the connection scheme has without hurting significantly the efficiency that the connectionless scheme has.

In another aspect of the invention, images acquired by surveillance cameras are converted into edge images to protect the privacy of individuals, for example. It is desirable to get images that are acquired by TV cameras installed at key points on roads for knowing traffic conditions and for finding the best route to a destination. One problem with providing such images is privacy protection.

By converting the images into edge images prior to public dissemination, the images do not show who are in the images. Edges are defined as points where the intensity changes significantly in spatial scanning. The edge images can be in either binary or gray-level. The edge images represent shapes of cars very well although they do not show human faces well because the intensity change over the human face is continuous and there is no clear edges.

As known to one of ordinary skill in the art, images acquired by roadside TV cameras are compressed and transferred to local stations. Conventionally, the local stations decompress the compressed images and recognize whether they include incidents. The compressed images are further transferred to upper level stations if incidents are recognized in the images. It would, however, be desirable if the local stations can carry out recognition processes without decompressing the compressed images.

In accordance with the present invention, a compression method provides recognition processing without decompressing the compressed images. With this compression method, the image is segmented by edges and other information. The intensity and color of each segmented section are represented as a group. A typical group representation form is a linear representation with which it is assumed that the intensity and color change linearly in space within each segment.

In another feature of the invention, an integrated network includes multiple networks that are funded by different institutions. For example, in FIG. 2, the first private network 10 needs to pay some fee to the second public network 20 if A and B communicate through X and Y. In one embodiment, the routers in the integrated network that connect difference ones of the networks 10,20,30,40 include a cost control function that allocates costs based on the traffic between the networks.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of routing traffic in an integrated network, comprising:
    coupling a first network to a second network to form at least a part of an integrated network;
    assigning a higher priority to routing paths associated with the first network than routing paths associated with the second network;
    preempting existing routing paths associated with the second network to establish routing paths requested by nodes associated with the first network; and
    generating a request for data from a first node of the integrated network, selecting a node of the integrated network neighboring the first node and establishing a routing path from the neighboring node, the neighboring node being selected based upon similarities of fields of view for cameras associated with the first node and the neighboring node, respectively.

2. The method of claim 1, further including assigning the higher priorities based upon a plurality of priority factors.

3. The method according to claim 2, wherein the priority factors are selected from the group consisting of a value assigned to a node, a value corresponding to an elapsed time to establish a connection, a value corresponding to a condition associated with a requested server node, a value corresponding to a requested bandwidth, and a value corresponding to a condition of nodes that neighbor nodes of a requested node.

4. The method according to claim 2, further including summing the plurality of priority factors to determine priority of a connection request.

5. The method according to claim 2, wherein a first of the plurality of priority factors includes a value assigned to a node.

6. The method according to claim 3, wherein a second of the plurality of priority factors includes a value corresponding to elapsed time.

7. The method according to claim 4, wherein a third of the plurality of priority factors includes a value corresponding to a condition associated with the requested server.

8. The method according to claim 1, further including converting a protocol of data traffic passing through the first network to the second network from a first protocol to a second protocol.

9. The method according to claim 8, further including converting the protocol based upon data traffic type.

10. The method according to claim 1, further including migrating a request from the first node to a second node.

11. The method according to claim 1, further including decreasing bandwidth of a request.

12. The method according to claim 1, wherein the first network comprises a traffic surveillance network including a plurality of cameras and a plurality of clients including a traffic center.

* * * * *